(12) United States Patent
Singh (10) Patent No.: US 11,102,278 B2
(45) Date of Patent: Aug. 24, 2021

(54) METHOD FOR MANAGING A SOFTWARE-DEFINED DATA CENTER IMPLEMENTING REDUNDANT CLOUD MANAGEMENT STACKS WITH DUPLICATE API CALLS PROCESSED IN PARALLEL

(71) Applicant: VMware, Inc., Palo Alto, CA (US)

(72) Inventor: Manu Pratap Singh, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 16/533,729

(22) Filed: Aug. 6, 2019

(65) Prior Publication Data

US 2019/0364098 A1 Nov. 28, 2019

Related U.S. Application Data

(63) Continuation of application No. 15/004,732, filed on Jan. 22, 2016, now Pat. No. 10,404,786.

(51) Int. Cl.
*H04L 29/08* (2006.01)
*H04L 1/22* (2006.01)
*H04L 12/24* (2006.01)
*G06F 9/50* (2006.01)
*G06F 9/455* (2018.01)

(52) U.S. Cl.
CPC ............ *H04L 67/10* (2013.01); *G06F 9/5077* (2013.01); *H04L 1/22* (2013.01); *H04L 41/04* (2013.01); *G06F 9/45558* (2013.01)

(58) Field of Classification Search
CPC .......... G06F 9/50; G06F 9/455; G06F 9/5072; G06F 9/5077; G06F 9/45558; G06F 13/00; G06Q 30/02; H04L 1/22; H04L 12/24; H04L 29/06; H04L 29/08; H04L 29/0809; H04L 29/08072; H04L 29/08117; H04L 41/04; H04L 41/12; H04L 41/22; H04L 41/0213; H04L 67/00; H04L 67/10
USPC ................................................ 709/219, 223
See application file for complete search history.

(56) References Cited

U.S. PATENT DOCUMENTS

| | | |
|---|---|---|
| 9,679,040 B1 | 6/2017 | Davis et al. |
| 2012/0324070 A1 | 12/2012 | Campion et al. |
| 2014/0143401 A1 | 5/2014 | Carlen et al. |
| 2015/0040132 A1 | 2/2015 | Robinson et al. |
| 2015/0324182 A1 | 11/2015 | Barros et al. |

*Primary Examiner* — Robert B Harrell
(74) *Attorney, Agent, or Firm* — Loza & Loza, LLP (57) ABSTRACT

A method for managing a software-defined data center is disclosed. The method involves implementing redundant cloud management stacks, processing duplicate application program interface (API) calls in parallel with the redundant cloud management stacks, and performing a data center operation corresponding to the processed duplicate API calls.

20 Claims, 7 Drawing Sheets

METHOD FOR MANAGING A SOFTWARE-DEFINED DATA CENTER IMPLEMENTING REDUNDANT CLOUD MANAGEMENT STACKS WITH DUPLICATE API CALLS PROCESSED IN PARALLEL

BACKGROUND

An internal cloud or "private" cloud is a cloud in which a user and a cloud service provider are part of the same organization (e.g., in-house), while an external or "public" cloud is a cloud that is provided by a third-party cloud service provider that provides cloud services to several different enterprises and/or individuals. A hybrid cloud is a cloud architecture in which a user is provided with seamless access to both private cloud resources (e.g., in-house) and public cloud resources (e.g., remote) in order to, for example, aggregate resource capability from both "private" and "public" clouds.

Typically, a hybrid cloud utilizes a configuration and management layer (e.g., a cloud management stack) and a hardware management layer (e.g., a virtualization management stack) to facilitate management of the hybrid cloud. For example, users perform operations on the hybrid cloud by interfacing with a management portal, which, in turn, interfaces with the cloud management stack and the virtualization management stack.

SUMMARY

In an embodiment, a method for managing a software-defined data center is disclosed. The method involves implementing redundant cloud management stacks, processing duplicate application program interface (API) calls in parallel with the redundant cloud management stacks, and performing a data center operation corresponding to the processed duplicate API calls.

In another embodiment, the redundant cloud management stacks are implemented by instantiating cloud management stacks that are functional equivalents.

In another embodiment, only one processed duplicate API call is performed and all other processed duplicate API calls are not performed.

In another embodiment, an error is recorded in an error log if processing a duplicate API call fails.

In another embodiment, upon performing the data center operation corresponding to the processed duplicate API calls, a response is duplicated to generate a number of duplicate responses and the number of duplicate responses are processed in parallel by the redundant cloud management stacks.

In another embodiment, only one of the processed responses is provided to a user.

In another embodiment, a non-transitory computer-readable storage medium is disclosed. In an embodiment, the non-transitory computer-readable storage medium includes instructions that, when executed by a processor, perform steps involving processing duplicate application program interface (API) calls in parallel with redundant cloud management stacks, and performing a data center operation corresponding to the processed duplicate API calls.

In another embodiment, the redundant cloud management stacks are implemented by instantiating cloud management stacks that are functional equivalents.

In another embodiment, only one processed duplicate API call is performed and all other processed duplicate API calls are not performed.

In another embodiment, an error is recorded in an error log if processing a duplicate API call fails.

In another embodiment, upon performing the data center operation corresponding to the processed duplicate API calls, a response is duplicated to generate a number of duplicate responses and the number of duplicate responses are processed in parallel by the redundant cloud management stacks.

In another embodiment, a method for managing a software-defined data center is disclosed. In the embodiment, the method involves receiving a user operation and generating a corresponding API call, providing duplicate API calls of the API call to a first cloud management stack and to a second cloud management stack for processing, processing the duplicate API calls, receiving at least one of the processed duplicate API calls, providing one of the processed duplicate API calls to a virtualization management stack, and performing a data center operation corresponding to the provided processed duplicate API call.

In another embodiment, the first cloud management stack and the second cloud management stack are redundant cloud management stacks.

In another embodiment, the first cloud management stack and the second cloud management stack are functional equivalents.

In another embodiment, only one of the processed duplicate API calls is provided to the virtualization management stack and all other processed duplicate API calls are not provided to the virtualization management stack.

In another embodiment, a response from the virtualization management stack is returned to a cloud portal by duplicating the response from the virtualization management stack, providing the duplicate responses to the first cloud management stack and to the second cloud management stack for processing, processing the duplicate responses, receiving at least one processed response, and providing at least one processed response to the cloud portal.

In another embodiment, only one of the received processed responses is provided to the cloud portal and all other received responses are not provided to the cloud portal.

In another embodiment, the API call is provided to the virtualization management stack via the second cloud management stack when the first cloud management stack is being updated and via the first cloud management stack when the second cloud management stack is being updated.

In another embodiment, an error is recorded in an error log if the number of duplicate API calls provided to the first cloud management stack and to the second cloud management stack does not equal the number of processed API calls received.

Other aspects and advantages of embodiments of the present invention will become apparent from the following detailed description taken in conjunction with the accompanying drawings.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Figure 1:
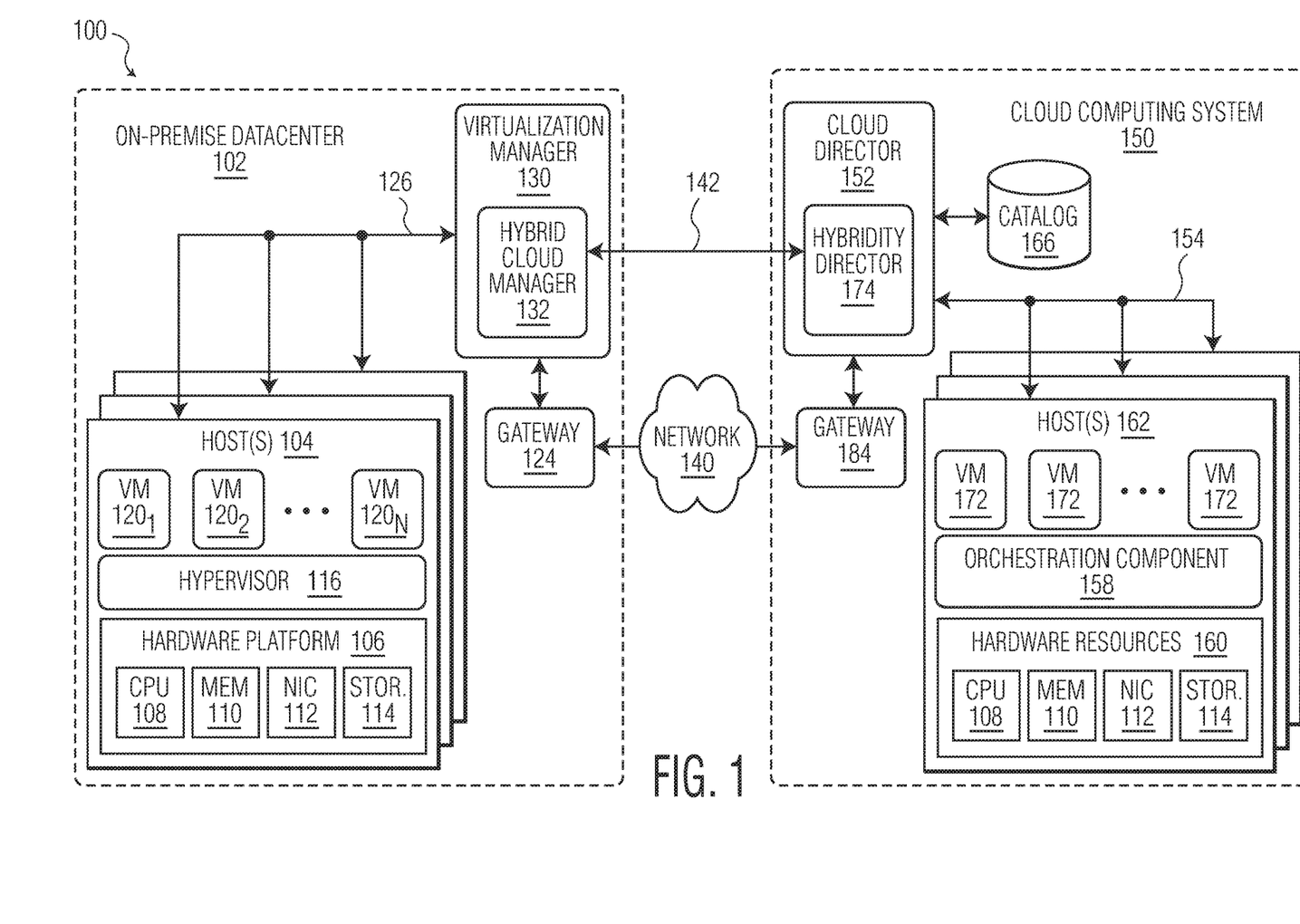
FIG. 1 is a block diagram of a hybrid cloud computing system in which one or more embodiments of the present disclosure may be utilized.

Although other implementations are envisioned, in an embodiment, a software-defined data center can be implemented in a hybrid cloud computing system. FIG. 1 is a block diagram of a hybrid cloud computing system 100 in which one or more embodiments of the present disclosure may be utilized. The hybrid cloud computing system 100 includes a virtualized computing system implementing an on-premise data center 102 and a virtualized computing system implementing a cloud computing system 150. The hybrid cloud computing system 100 is configured to provide a common platform for managing and executing virtual workloads seamlessly between the on-premise data center 102 and the cloud computing system 150. In one embodiment, the on-premise data center 102 may be a data center controlled and administrated by a particular enterprise or business organization, while the cloud computing system 150 may be operated by a cloud computing service provider. As such, the on-premise data center 102 may sometimes be referred to as a "private" cloud, and the cloud computing system 150 may be referred to as a "public" cloud.

The on-premise data center 102 includes one or more host computer systems ("hosts") 104. Hosts may be constructed on a hardware platform 106, such as an x86 architecture platform. As shown, the hardware platform 106 of each host 104 may include conventional components of a computing device, such as one or more processors (CPUs) 108, system memory 110, a network interface 112, storage system 114, and other input/output devices such as, for example, a mouse and keyboard (not shown). The CPU 108 is configured to execute instructions, for example, executable instructions that perform one or more operations described herein and may be stored in the system memory 110 and in local storage. The system memory 110 is a device allowing information, such as executable instructions, cryptographic keys, virtual disks, configurations, and other data, to be stored and retrieved. The system memory 110 may include, for example, one or more random access memory (RAM) modules. The network interface 112 enables the host 104 to communicate with another device via a communication medium, such as a network 122 within the on-premise data center 102. The network interface 112 may be one or more network adapters, also referred to as a Network Interface Card (NIC). The storage system 114 represents local storage devices (e.g., one or more hard disks, flash memory modules, solid state disks, and optical disks) and/or a storage interface that enables the host 104 to communicate with one or more network data storage systems (e.g., a storage area network). Examples of a storage interface are a host bus adapter (HBA) that couples the host to one or more storage arrays, such as a storage area network (SAN) or a network-attached storage (NAS), as well as other network data storage systems.

Each host 104 is configured to provide a virtualization layer that abstracts processor, memory, storage, and networking resources of the hardware platform 106 into multiple virtual machines $120_1$ to $120_N$ (collectively referred to as VMs 120) that run concurrently on the same hosts. The VMs 120 run on top of a software interface layer, referred to herein as a hypervisor 116, that enables sharing of the hardware resources of the host 104 by the VMs 120. One example of the hypervisor 116 that may be used in an embodiment described herein is a VMware ESXi™ hypervisor provided as part of the VMware vSphere® solution made commercially available from VMware, Inc. of Palo Alto, Calif. The hypervisor 116 may run on top of the operating system of the host 104 or directly on hardware components of the host 104.

The on-premise data center 102 includes a virtualization management component (depicted in FIG. 1 as virtualization manager 130) that may communicate to the plurality of hosts 104 via a network, sometimes referred to as a management network 126. In one embodiment, the virtualization manager 130 is a computer program that resides and executes in a central server, which may reside in the on-premise data center 102, or alternatively, running as a VM in one of the hosts 104. One example of a virtualization manager is the vCenter Server™ product made available from VMware, Inc. The virtualization manager 130 is configured to carry out administrative tasks for the on-premised data center 102, including managing the hosts 104, managing the VMs 120 running within each host 104, provisioning VMs, migrating VMs from one host to another host, and load balancing between the hosts 104.

In one embodiment, the virtualization manager 130 includes a hybrid cloud management module (depicted as hybrid cloud manager 132) configured to manage and integrate virtualized computing resources provided by the cloud computing system 150 with virtualized computing resources of the on-premise data center 102 to form a unified "hybrid" computing platform. Hybrid cloud manager 132 is configured to deploy VMs in the cloud computing system 150, transfer VMs from the on-premise data center 102 to the cloud computing system 150, and perform other "cross-cloud" administrative tasks, as described in greater detail later. In one implementation, the hybrid cloud manager 132 is a module or plug-in complement to the virtualization manager 130, although other implementations may be used, such as a separate computer program executing in a central server or running in a VM in one of the hosts 104. One example of the hybrid cloud manager 132 is the VMware vCloud Connector® product made available from VMware, Inc.

In one embodiment, the hybrid cloud manager 132 is configured to control network traffic into the network 140 via a gateway component 124. The gateway component 124 (e.g., executing as a virtual appliance) is configured to provide the VMs 120 and other components in the on-premise data center 102 with connectivity to the network 140 (e.g., Internet). The gateway component 124 may manage external public IP addresses for the VMs 120 and route traffic incoming to and outgoing from the on-premise data center 102 and provide networking services, such as firewalls, network address translation (NAT), dynamic host configuration protocol (DHCP), load balancing, and virtual private network (VPN) connectivity over a network 140.

In one or more embodiments, the cloud computing system 150 includes one or more hosts 162 in which a user may provision VMs 172, deploy multi-tier applications on the VMs, and/or execute workloads. The hosts include hardware resources 160 including one or more processors (CPUs) 108, system memory 110, a network interface 112, a storage system 114 (e.g., one or more storage area systems), and other input/output devices such as, for example, a mouse and keyboard (not shown). It is recognized that the hardware resources 160 of the cloud computing system 150 may in fact be distributed across multiple data centers in different locations.

In one embodiment, hardware resources of a host are managed by an orchestration component 158 (e.g., implemented as a process running in a VM) that provides infrastructure resources in response to provisioning requests. For example, if an enterprise required a specified number of virtual machines (VMs) to deploy a web applications or to modify (e.g., scale) a currently running web application to support peak demands, the orchestration component 158 can initiate and manage the instantiation of virtual machines (e.g., VMs 172) on the hosts 162 to support such requests. In one embodiment, the orchestration component 158 instantiates virtual machines according to a requested template that defines one or more virtual machines having specified virtual computing resources (e.g., compute, networking, storage resources). In one example, similar to the on-premise data center 102, the cloud computing system 150 may be implemented by running on the hosts 162 VMware ESXi™-based hypervisor technologies provided by VMware, Inc. (although it should be recognized that any other virtualization technologies, including Xen® and Microsoft Hyper-V® virtualization technologies may be utilized consistent with the teachings herein).

In one embodiment, the cloud computing system 150 may include a cloud director 152 (e.g., run in one or more virtual machines) that manages allocation of virtual computing resources to an enterprise for deploying applications via an enterprise network 154. The cloud director 152 may be accessible to users via a Representational State Transfer (REST) application program interface (API) or any other client-server communication protocol. The cloud director 152 may authenticate connection attempts from the enterprise using credentials issued by the cloud computing provider. The cloud director 152 maintains and publishes a catalog 166 of available virtual machine templates and packaged virtual machine applications that represent virtual machines that may be provisioned in a cloud computing environment. One example of the cloud director 152 is the VMware vCloud Director® produced by VMware, Inc.

While FIG. 1 depicts a single connection between the gateway component 124 and a cloud-side gateway 184 for illustration purposes, it should be recognized that multiple connections between multiple gateway components 124 and cloud-side gateways 184 may be used. Furthermore, while FIG. 1 depicts a single instance of a cloud-side gateway 184, it is recognized that the cloud-side gateway 184 may represent multiple cloud-side gateway components within the cloud computing system 150.

In an embodiment, the cloud computing system 150 includes a hybridity director 174 configured to communicate with the corresponding hybrid cloud manager 132 in the on-premise data center 102 to enable a common virtualized computing platform between the on-premise data center 102 and the cloud computing system 150. The hybridity director 174 (e.g., executing as a virtual appliance) may communicate with the hybrid cloud manager 132 using Internet-based traffic via a VPN tunnel established between the gateway components 124 and the cloud-side gateway 184. In one embodiment, the hybridity director 174 may control the cloud-side gateway 184 to control network traffic into the cloud computing system.

Figure 2:
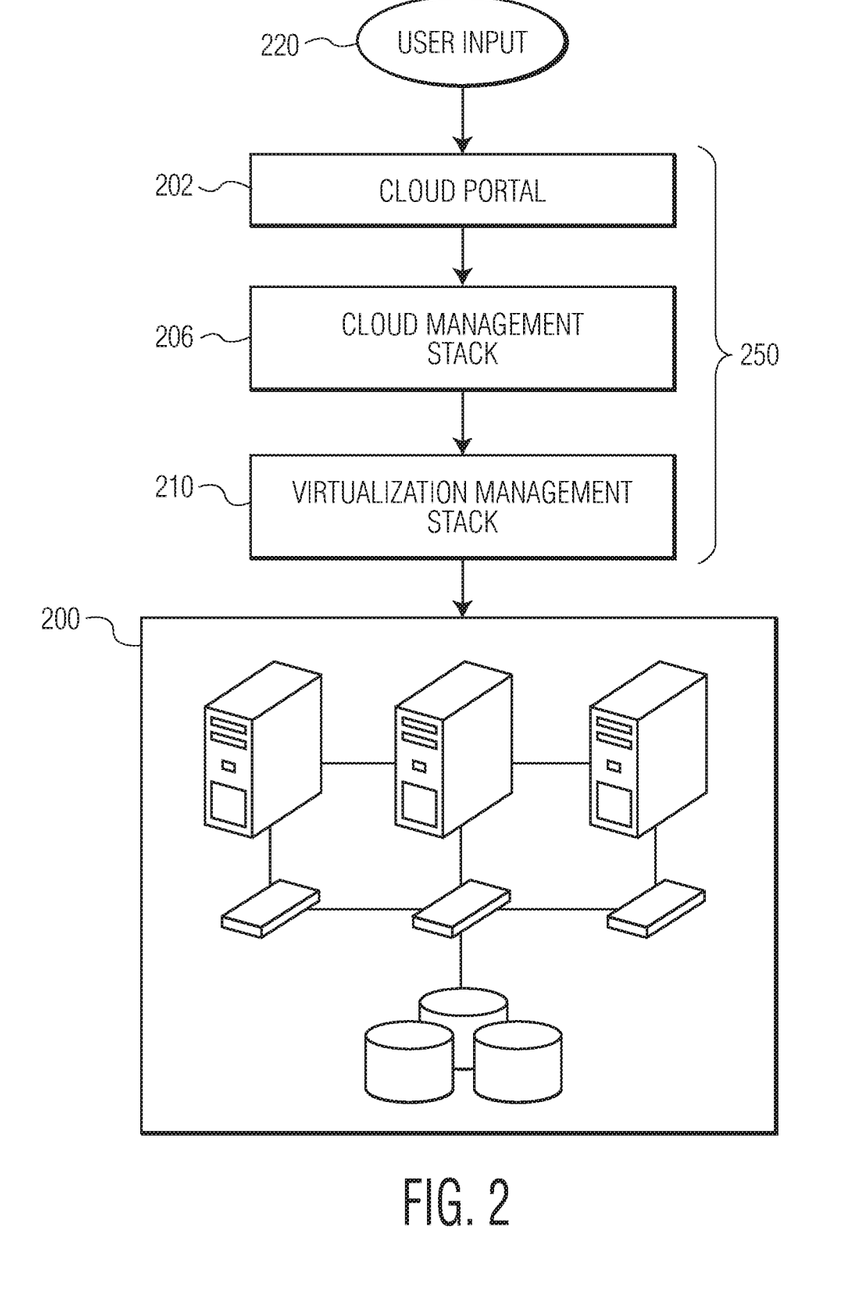
FIG. 2 illustrates the operation flow within a conventional software-defined data center stack connected to a hybrid cloud computing system.

In an embodiment, user operations for managing the hybrid cloud computing system are facilitated using a software-defined data center stack. FIG. 2 illustrates the operation flow within a conventional software-defined data center stack 250 connected (e.g., directly or indirectly) to a hybrid cloud computing system 200. As illustrated in FIG. 2, a conventional software-defined data center stack includes a cloud portal 202, a cloud management stack 206, and a virtualization management stack 210. The cloud portal can be implemented as a unified point of access for a user to a cloud, which allows for complex cloud management operations to be hidden from or simplified for the user and the integration of additional functionality. For example, the cloud portal can facilitate simplified billing operations, which are not typically standard functionality of a cloud and are typically very complex. In an embodiment, the cloud portal can be implemented using a simplified user interface and/or an API interface such as, for example, vCloud Air™. The cloud management stack can be implemented by, for example, vCloud Director™ to facilitate multi-tenancy in a cloud, resource pooling, and network and storage behaviors. The virtualization management stack can be implemented using, for example, vSphere™, as provided by VMware, but other virtualization management solutions can be used as well. In an embodiment, the virtualization management stack can be configured to provide direct API access to virtualized payloads, such as virtual machines, virtual distributed switches, and/or virtual distributed portgroups. In an embodiment, the cloud portal, cloud management stack, and virtualization management stack can be implemented in virtual machines. Users typically perform operations by interfacing with the cloud portal via a user input 220, which, in turn, generates a corresponding API call for the operation requested by the user. The API call can then be provided to the cloud management stack for further processing and subsequently provided to the virtualization management stack. For example, when a user provisions a new virtual machine, the user provides information for creating a virtual machine via the cloud portal. The cloud portal then invokes a REST API call using the information and passes the call to the cloud management stack for processing and, subsequently, to the virtualization management stack.

In operation, user operations can fail or otherwise be impeded or delayed due to errors caused by the cloud management stack and, if such errors occur, user operations are typically interrupted until the errors are resolved. For example, if a user requests to create a new VM, then the cloud management stack will need to update its inventory in order to correctly report the successful creation of the new VM. Under a high system load (e.g., the creation of many new VMs), the cloud management stack may fail to update and, thus, report that the creation of the new VM has failed. Thus, errors in the cloud management stack can interfere with the processing of user operations.

In an embodiment, a method for managing a software-defined data center is disclosed. The method involves implementing redundant cloud management stacks, processing duplicate application program interface (API) calls in parallel with the redundant cloud management stacks, and performing a data center operation corresponding to the processed duplicate API calls. In an embodiment, an API call is generated in response to a user operation and duplicates of the API call are provided to a first cloud management stack and to a second cloud management stack for processing. In an embodiment, the first cloud management stack and the second cloud management stack are redundant (e.g., functional equivalents). In an embodiment, cloud management stacks are functional equivalents when an API call would be processed in the same manner by both cloud management stacks. For example, two cloud management stacks running the same version of cloud management stack software would be functional equivalents. Although several of the duplicate API calls may be successfully processed, only one of the processed API calls is provided to a virtualization management stack, which is configured to perform the operation corresponding to the provided API call. Thus, only a single operation is performed for each user operation regardless of the number of duplicate API calls that are successfully processed. Additionally, by implementing redundant cloud management stacks in parallel and, thus, processing duplicate API calls in parallel, even if an error occurs in one stack or the other, the API call will still be received by the virtualization management stack and the operation will be performed (e.g., the new VM will be successfully powered on) with less delay in operation (e.g., less time spent reprocessing an API call) than when redundant cloud management stacks are not implemented. Furthermore, the cost to add resources (e.g., memory and processing power) for additional redundant stacks may be outweighed by the improved user experience. In an embodiment, multiple redundant stacks can be added to further improve the user experience.

Figure 3:
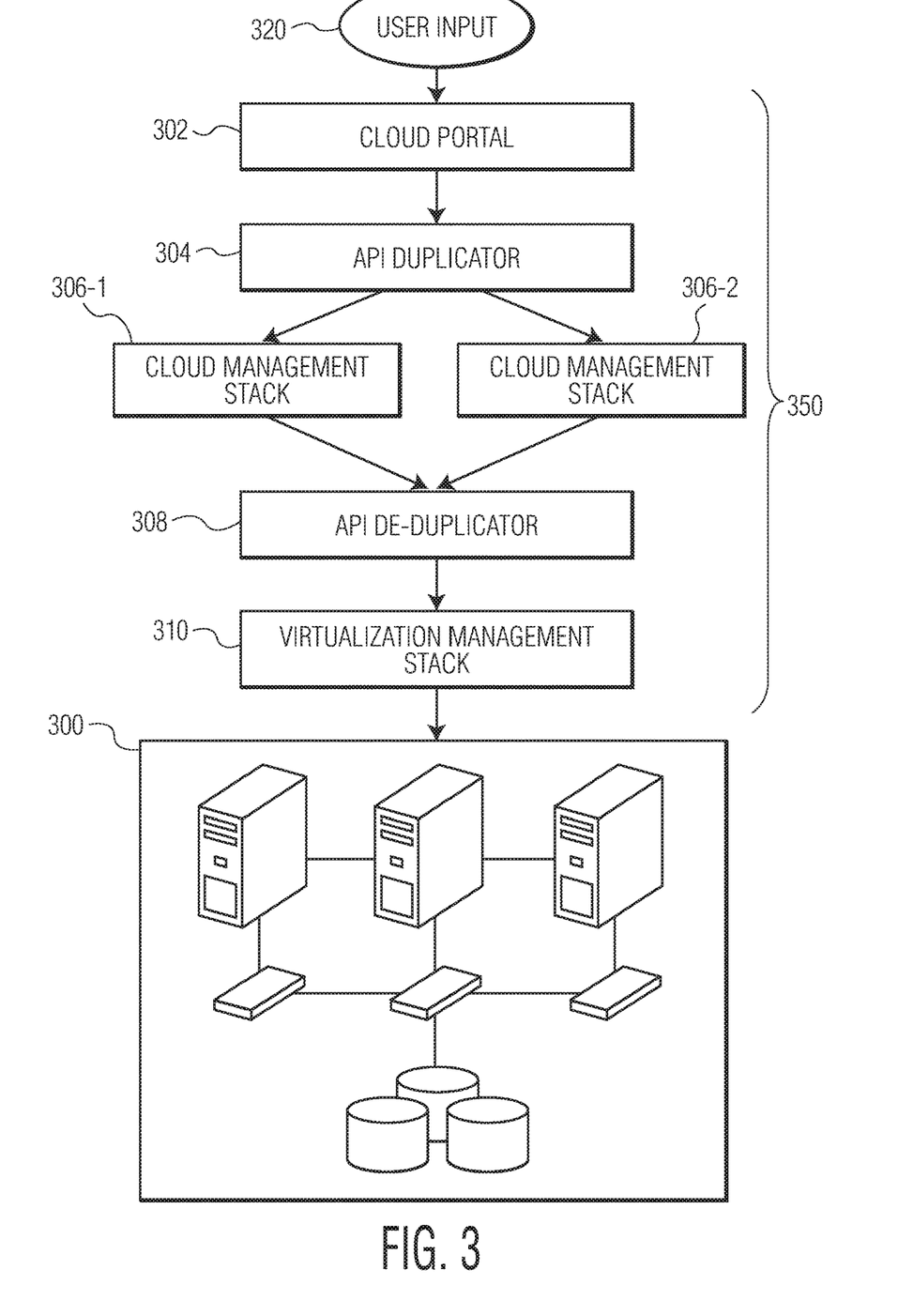
FIG. 3 illustrates the operation flow within a software-defined data center stack in accordance with an embodiment of the invention.

FIG. 3 illustrates the operation flow within a software-defined data center stack 350 in accordance with an embodiment of the invention. Similar to the software-defined data center stack of FIG. 2, the software-defined data center stack of FIG. 3 includes a cloud portal 302, a cloud management stack 306-1, and a virtualization management stack 310 connected (e.g., directly or indirectly) to a hybrid cloud computing system 300, and further includes a second cloud management stack 306-2 as well as an API duplicator 304 and an API de-duplicator 308. In an embodiment, the first and second cloud management stacks could be implemented, manually by a user or automatically by additional management software, with vCloud Director. The API duplicator and API de-duplicator can be implemented using one or more proxy device and the proxy device can be implemented in a virtual machine. In an embodiment, the first cloud management stack and the second cloud management stack are implemented between the cloud portal and the virtualization stack with the same configuration. In an embodiment, the first and second cloud management stacks are redundant and functional equivalents of each other. For example, the first and second cloud management stacks can be implemented as functional equivalents when they are running the same version of a cloud management stack software (e.g., vCloud Director and NSX manager). In operation, when the cloud portal generates an API call corresponding to a user operation (e.g., based on a user input 320), the API call is provided to the API duplicator. The API duplicator duplicates the API call and provides duplicate API calls to the first cloud management stack and to the second cloud management stack. In an embodiment, duplicate API calls have the same parameters and qualities as the duplicated API call. The duplicate API calls are processed by the respective cloud management stacks in parallel. In an embodiment, processing an API call involves authenticating the API call, invoking a handler for the API call, preparing and invoking a corresponding API call to the virtualization management stack, and waiting for a response from the virtualization management stack. After the API calls are processed by the cloud management stacks, the API calls are provided to the API de-duplicator. In an embodiment, the API de-duplicator provides one of the duplicate API calls to the virtualization stack and does not provide the other duplicate API call to the virtualization stack. In an embodiment, if the number of duplicate API calls is not equal to the number of processed API calls received by the API de-duplicator, then an error is recorded in an error log. In an embodiment, a user or administrator can review the log to determine why an API call was not received (e.g., unsuccessfully processed). The virtualization management stack then performs the operation corresponding to the processed API call. Thus, as long as at least one of API calls is processed by the cloud management stacks and provided to the API de-duplicator, the corresponding operation will be performed.

Figure 4:
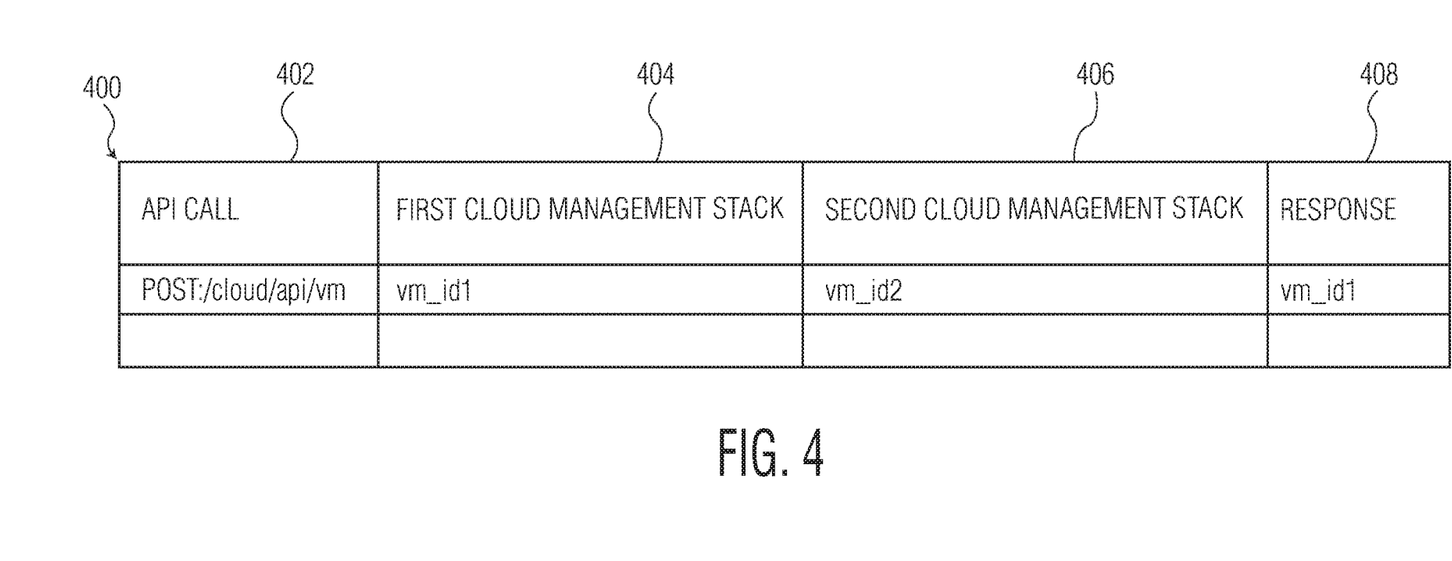
FIG. 4 is an example of a table used by an API duplicator to track corresponding entities in redundant cloud management stacks in accordance with an embodiment of the invention.

In an embodiment, the API duplicator utilizes a table in order to track information regarding the duplicate API calls. FIG. 4 is an example of a table 400 used by an API duplicator to track corresponding entities in redundant cloud management stacks in accordance with an embodiment of the invention. The table indicates an API call to be performed on an entity 402, a tracker ID for the entity in a first cloud management stack 404, a tracker ID for the entity in a second cloud management stack 406, and a tracker ID for the entity to be returned to a caller 408. In the example of FIG. 4, the API call is "POST:/cloud/api/vm", the tracker ID for the API call in the first cloud management stack is "vm_id1", the tracker ID for the API call in the second cloud management stack is "vm_id2", and the tracker ID returned to the caller is "vm_id1". In an embodiment, when an API call is provided to the API duplicator, the API duplicator creates an entry in the table and populates the columns accordingly. In an embodiment, the tracker ID returned to the caller (e.g., "vm_id1" in FIG. 4) can be the tracker ID from any cloud management stack for which the API call was successfully processed. For example, if an API call is processed successfully by the first cloud management stack and by the second cloud management stack, then the tracker ID for either stack can be used, but if the API call is only successfully processed by the first cloud management stack, then the tracker ID for the second stack cannot be used. In an embodiment, the tracker ID returned to the caller can be used when generating additional API calls for the entity. For example, when generating a GET call to determine the status of the VM created by the API call in FIG. 4, the GET call can be generated using "vm_id1." In an embodiment, when the additional API call (e.g., the GET call) is received by the API duplicator, the API duplicator generates duplicate API calls for each cloud management stack using the corresponding tracker ID for the entity in each cloud management stack. For example, the GET call for the first cloud management stack will use "vm_id1" and the GET call for the second cloud management stack will use "vm_id2." In an additional example, if a first API call for creating a VM is provided to the API duplicator, then a subsequent call to power on the VM can be duplicated into a first API call (e.g., "https://<ip-of-first-vcloud-director>/cloud/api/vm/vm_id1/powerOn") and provided to the first cloud management stack using the first tracker id ("vm_id1") and into a second API call (e.g., "https://<ip-of-second-vcloud-director>/cloud/api/vm/vm_id2/powerOn") and provided to the second cloud management stack using the second tracker ID ("vm_id2").

In an embodiment, the API de-duplicator can use the table of FIG. 4 to determine which API call to send to the virtualization management stack and which API call (or calls) to not send.

Figure 5:
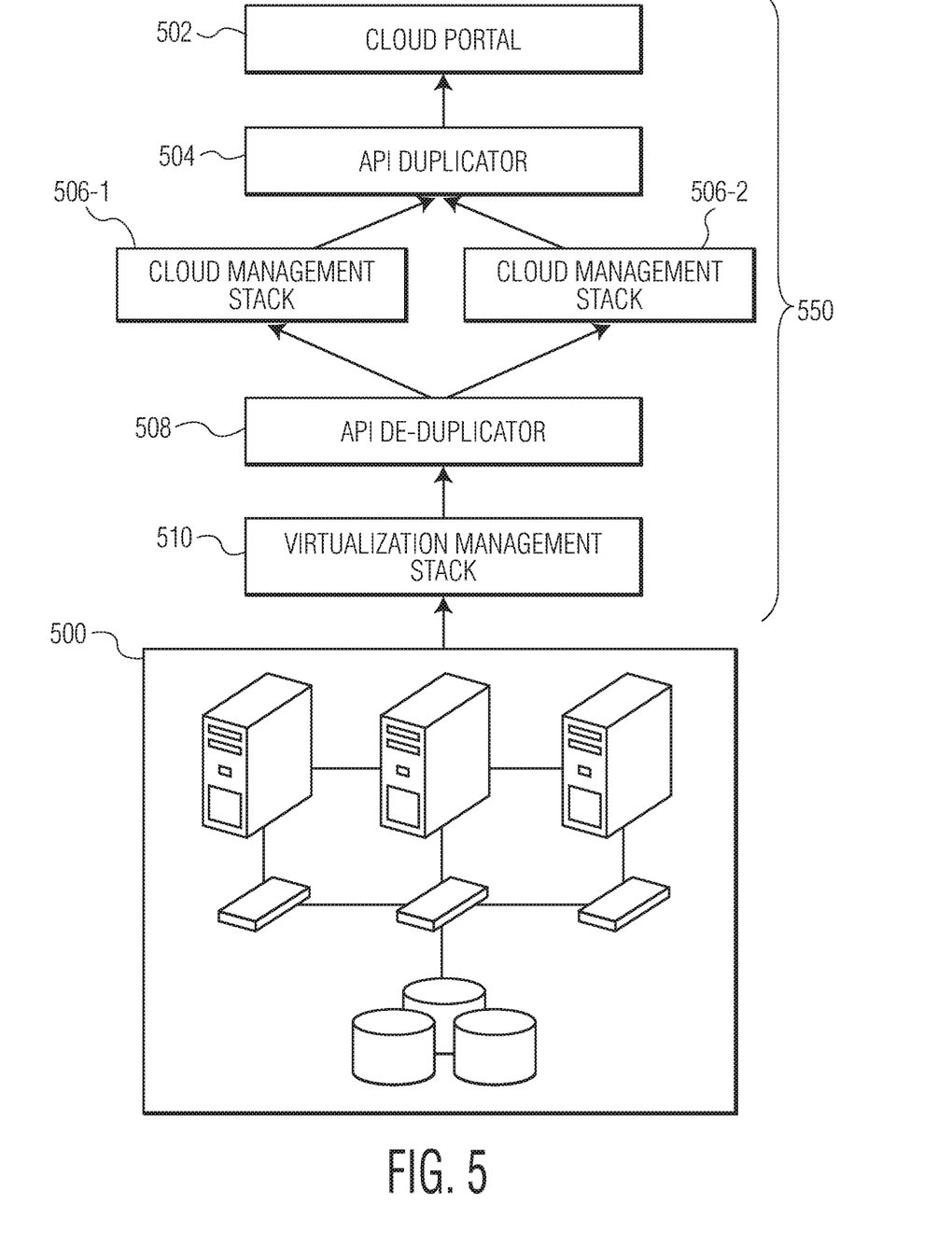
FIG. 5 illustrates the operation flow in a software-defined data center stack in which a response is returned from the virtualization stack in accordance with an embodiment of the invention.

In an embodiment, responses can be returned from the virtualization management stack in a similar manner. FIG. 5 illustrates the operation flow within a software-defined data center stack 550 in which a response is returned from the virtualization stack in accordance with an embodiment of the invention. Similar to the software-defined data center stack of FIG. 3, the software-defined data center of FIG. 5 includes a cloud portal 502, an API duplicator 504, a first cloud management stack 506-1, a second cloud management stack 506-2, an API de-duplicator 508, and a virtualization management stack 510 connected (e.g., either directly or indirectly) to a hybrid cloud computing system 500. In operation, when a response is generated by the virtualization management stack, the response is provided to the API de-duplicator. The API de-duplicator duplicates the response and provides a duplicate response to the first cloud management stack and to the second cloud management stack. In an embodiment, the API de-duplicator duplicates the response by copying the response and providing the response to each cloud management stack from which a duplicate API call was received regardless of whether the API call was then provided to the virtualization management stack. The duplicate responses are processed by the cloud management stacks and the processed messages are provided to the API duplicator. In an embodiment, processing a response involves updating a cloud database that may be stored in the API duplicator. For example, if a response to an API call to create a new VM is received, a managed object reference for the VM is added to a cloud database. In an embodiment, the API duplicator provides only one duplicate response to the cloud portal regardless of the number of responses received by the API duplicator. Thus, at least one response is provided to the cloud portal even if one of the cloud management stacks experiences an error.

Figure 6:
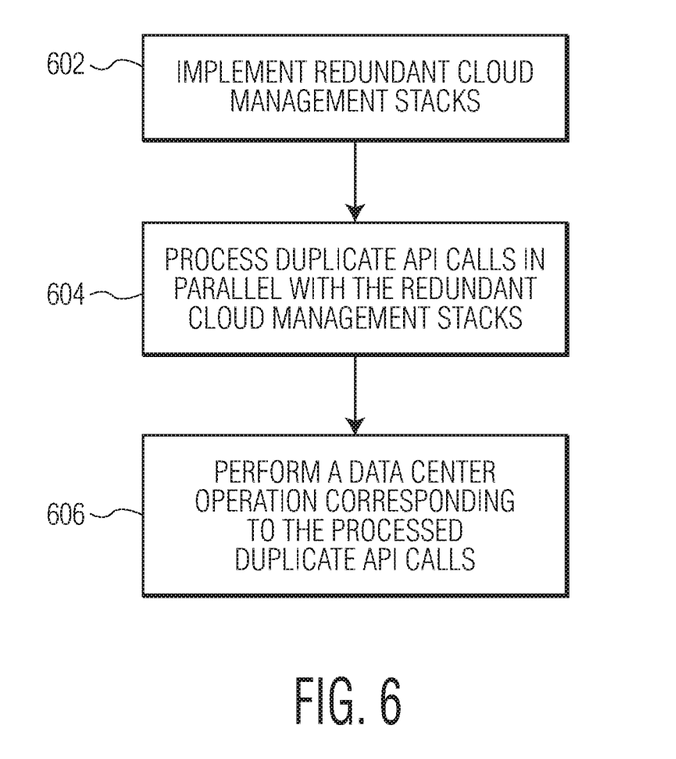
FIG. 6 is a process flow diagram of a method for managing a software-defined data center in accordance with an embodiment of the invention.

FIG. 6 is a process flow diagram of a method for managing a software-defined data center in accordance with an embodiment of the invention. At block 602, redundant cloud management stacks are implemented. At block 604, duplicate API calls are processed in parallel with the redundant cloud management stacks. In an embodiment, duplicate API calls are duplicated instances of an API call generated in response to a user operation. For example, if an API call identifying a particular virtual machine is generated in response to a user powering up that virtual machine, then duplicate API calls can be generated identifying the same particular virtual machine and operation. At block 606, a data center operation corresponding to the processed duplicate API call is performed. In an embodiment, although several duplicate API calls can be received, the data center operation corresponding to the duplicate API calls is only performed once.

Figure 7:
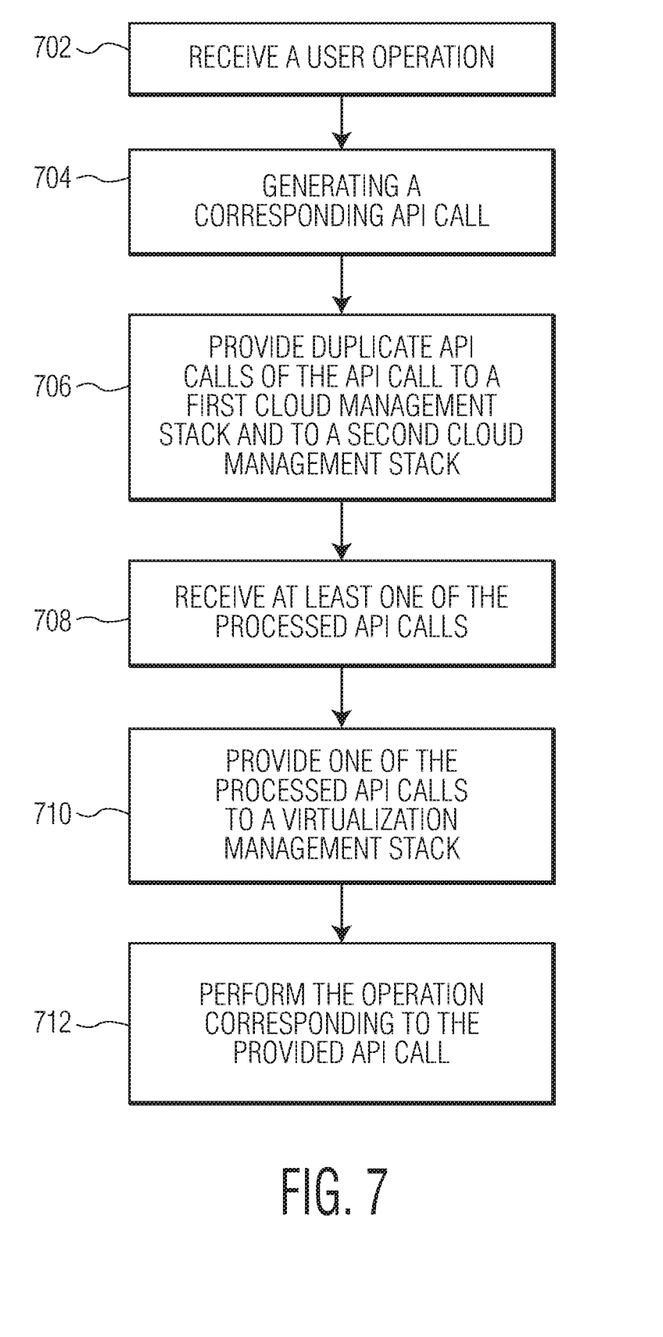
FIG. 7 is a process flow diagram of a method for managing a software-defined data center in accordance with an embodiment of the invention.

FIG. 7 is a process flow diagram of a method for managing a software-defined data center in accordance with an embodiment of the invention. At block 702, a user operation is received. In an embodiment, a user can request an operation (e.g., powering on a VM, migrating a VM, allocating memory from a datastore to a VM, etc.) via a cloud portal. At block 704, an API call corresponding to the requested operation is generated. At block 706, duplicate API calls of the API call generated at block 704 are provided to a first cloud management stack and to a second cloud management stack. In an embodiment, the API call is duplicated by an API duplicator, which generates duplicate API calls. In an embodiment, duplicate API calls are API calls that call the same functionality. For example, duplicate API calls for powering on a VM would identify the same VM and direct the same change in state (e.g., power on). In an embodiment, the first cloud management stack and the second cloud management stack are redundant cloud management stacks and are configured to process duplicate API calls in a functionally equivalent manner. At block 708, at least one of the processed duplicate API calls is received. In an embodiment, processed duplicate API calls are received by an API de-duplicator and, if the number of processed duplicate API calls received by the API de-duplicator is not equal to the number of duplicate API calls generated by the API duplicator, then an error is recorded in an error log. For example, if two duplicate API calls to power on a VM are generated by the API duplicator, but only the processed duplicate API call from the first cloud management stack is received by the API de-duplicator, then an error reporting the existence of configuration issues in the second cloud management stack is recorded in an error log. At block 710, one of the processed duplicate API calls is provided to a virtualization management stack. In an embodiment, the API de-duplicator provides only one of the processed duplicate API calls to the virtualization management stack and does not provide all other received processed duplicate API calls for a given API call. At block 712, the operation corresponding to the provided API call is performed. In an embodiment, the operation is performed by the virtualization management stack.

In an embodiment, a response to the operation from the virtualization management stack can flow in the opposite direction of FIG. 5 and involves duplicating the response at the API de-duplicator and providing a duplicate response to the first cloud management stack and to the at least one redundant cloud management stack for processing before receipt at the API duplicator. The API duplicator can then provide only one duplicate response of the duplicate responses to the cloud portal for review by a user and errors can be recorded in an error log if the number of duplicate responses at the API de-duplicator does not equal the number of processed responses received by the API duplicator. In an embodiment, the API duplicator and the API de-duplicator can be facilitated by the same component (e.g., same computer code engine or same memory and processor).

By processing duplicate API calls in parallel with redundant cloud management stacks, a configuration error in one of the cloud management stacks is less likely to cause a user operation to fail. For example, if two cloud management stacks are used and a user requests to create a new VM, then the cloud management stacks will need to update their inventory in order to correctly report the successful creation of the new VM. Under a high system load (e.g., the creation of many new VMs), one of the cloud management stacks may fail to update correctly, but the other one may still update correctly. Thus, in the example, while the first cloud management stack will report that the creation of the new VM has failed, the user will still see that creation of the new VM was a success because the second cloud management stack will process the update correctly in parallel (e.g., at the same time) and report that the creation of the new VM is a success without any perceptible delay or degradation in the user experience to the user. In another example, if a database used by a first cloud management stack to store the configuration of a distributed computing system becomes corrupted, then the database can be restored from a database used by the second cloud management stack. In another example, if the cloud management stacks need to be updated or changed, then API calls can be processed by the first cloud management stack while the redundant cloud management stack is updated or changed and API calls can be processed by the redundant API call while the first cloud management stack is updated or changed. As shown by the examples, the decreased rate of failure, capacity to recover from system failures and corruptions, and capacity to update or change the configuration of cloud management stacks without interruption can translate to an improvement of performance and, thus, can improve the user experience when managing a hybrid cloud computing system.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a non-transitory computer-readable storage medium for execution by a computer. As an example, an embodiment of a non-transitory computer-readable storage medium includes a computer useable storage medium configured to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for managing a software-defined data center, the method comprising:
   implementing redundant cloud management stacks above a virtualization management stack;
   receiving an application programming interface (API) call at an API duplicator;
   duplicating the API call to generate duplicate API calls;
   providing the duplicate API calls to the redundant cloud management stacks;
   processing the duplicate API calls in parallel within the redundant cloud management stacks;
   providing the processed duplicate API calls to an API de-duplicator;
   providing only one of the processed duplicate API calls from the API de-duplicator to the virtualization management stack; and
   performing, by the virtualization management stack, a data center operation corresponding to the one processed duplicate API call that was provided from the API de-duplicator.

2. The method of claim 1, wherein the redundant cloud management stacks are implemented by instantiating cloud management stacks that are functional equivalents.

3. The method of claim 2, wherein the redundant cloud management stacks have the same version of cloud management software.

4. The method of claim 1, wherein, upon performing the data center operation corresponding to the processed duplicate API calls, a response is duplicated to generate a number of duplicate responses and the number of duplicate responses are processed in parallel by the redundant cloud management stacks.

5. The method of claim 4, wherein only one of the processed responses is provided to a user.

6. The method of claim 1, wherein the redundant cloud management stacks and the virtualization management stack are components of a software-defined data center stack.

7. The method of claim 1, wherein an error is recorded in an error log if processing a duplicate API call fails.

8. A non-transitory computer-readable storage medium comprising instructions that, when executed by a processor, perform steps comprising:
   receiving an application programming interface (API) call at an API duplicator;
   duplicating the API call to generate duplicate API calls;
   providing the duplicate API calls to redundant cloud management stacks that are implemented above a virtualization management stack;
   processing the duplicate API calls in parallel within the redundant cloud management stacks;
   providing the processed duplicate API calls to an API de-duplicator;
   providing only one of the processed duplicate API calls from the API de-duplicator to the virtualization management stack; and
   performing, by the virtualization management stack, a data center operation corresponding to the one processed duplicate API call that was provided from the API de-duplicator.

9. The non-transitory computer-readable storage medium of claim 8, wherein the redundant cloud management stacks are implemented by instantiating cloud management stacks that are functional equivalents.

10. The non-transitory computer-readable storage medium of claim 9 wherein the redundant cloud management stacks have the same version of cloud management software.

11. The non-transitory computer-readable storage medium of claim 8, wherein, upon performing the data center operation corresponding to the processed duplicate API calls, a response is duplicated to generate a number of duplicate responses and the number of duplicate responses are processed in parallel by the redundant cloud management stacks.

12. The non-transitory computer-readable storage medium of claim 11, wherein only one of the processed responses is provided to a user.

13. The non-transitory computer-readable storage medium of claim 8, wherein the redundant cloud management stacks and the virtualization management stack are components of a software-defined data center stack.

14. The non-transitory computer-readable storage medium of claim 8, wherein an error is recorded in an error log if processing a duplicate API call fails.

15. A method for managing a software-defined data center, the method comprising:
   receiving a user operation and generating a corresponding API call;
   receiving the API call at an API duplicator;
   duplicating the API call to generate duplicate API calls;
   providing the duplicate API calls of the API call to a first cloud management stack and to a second cloud management stack for processing, wherein the first and second cloud management stacks are redundant cloud management stacks that are implemented above a virtualization management stack;
   processing the duplicate API calls at the first cloud management stack and the second cloud management stack;
   receiving at least one of the processed duplicate API calls at a de-duplicator;
   providing only one of the processed duplicate API calls from the de-duplicator to the virtualization management stack; and
   performing, by the virtualization management stack, a data center operation corresponding to the only one processed duplicate API call that was provided to the virtualization management stack.

16. The method of claim 15, wherein the redundant cloud management stacks are implemented by instantiating cloud management stacks that are functional equivalents.

17. The method of claim 16, wherein the redundant cloud management stacks have the same version of cloud management software.

18. The method of claim 15, wherein, upon performing the data center operation corresponding to the processed duplicate API calls, a response is duplicated to generate a number of duplicate responses and the number of duplicate responses are processed in parallel by the redundant cloud management stacks.

19. The method of claim 18, wherein only one of the processed responses is provided to a user.

20. The method of claim 15, wherein the first cloud management stack and the second cloud management stack are functional equivalents.

* * * * *